United States Patent [19]

Rohatgi

[11] 3,867,299

[45] Feb. 18, 1975

[54] METHOD OF MAKING SYNTHETIC RESIN COMPOSITES WITH MAGNETIC FILLERS

[75] Inventor: Pradeep Kumar Rohatgi, Bethlehem, Pa.

[73] Assignee: Bethlehem Steel Corporation, Bethlehem, Pa.

[22] Filed: Aug. 11, 1971

[21] Appl. No.: 172,340

[52] U.S. Cl......... 252/62.54, 252/62.51, 252/62.53, 260/37 M, 260/37 N, 260/40 R, 260/41 B, 260/41.5 R, 260/42, 260/42.44, 264/24, 425/174, 425/174.8
[51] Int. Cl. .............................................. H01f 1/24
[58] Field of Search........... 252/62.54, 62.53, 62.51; 260/37 M, 39 M, 41 B; 425/174, 174.8; 264/24; 18/DIG. 33

[56] References Cited
UNITED STATES PATENTS

| | | | |
|---|---|---|---|
| 2,848,748 | 8/1958 | Crump | 252/62.54 |
| 2,849,312 | 8/1958 | Peterman | 252/62.54 |
| 2,964,793 | 12/1960 | Blume | 264/24 |
| 3,051,988 | 9/1962 | Baermann | 425/174.8 |
| 3,066,355 | 12/1962 | Schloemann et al. | 252/62.54 |
| 3,067,140 | 12/1962 | Davis | 252/62.54 |
| 3,080,319 | 3/1963 | Arrington | 252/62.54 |
| 3,117,092 | 1/1964 | Parker | 252/62.54 |
| 3,126,617 | 3/1964 | Blume | 252/62.54 |
| 3,240,621 | 3/1966 | Flower et al. | 252/62.54 |
| 3,261,706 | 7/1966 | Nesh | 252/62.54 |
| 3,291,226 | 12/1966 | Winkel | 252/62.54 |
| 3,592,687 | 7/1971 | Schnell et al. | 252/62.54 |
| 3,602,986 | 9/1971 | Conwicke | 264/24 |
| 3,650,828 | 3/1972 | Higashi | 252/62.54 |

FOREIGN PATENTS OR APPLICATIONS

| | | | |
|---|---|---|---|
| 226,097 | 8/1958 | Australia | 252/62.54 |
| 1,057,348 | 2/1967 | Great Britain | 252/62.54 |

OTHER PUBLICATIONS

Chamot et al. et al., Handbook of Chemical Microscopy, John Wiley & Sons, N.Y. N.Y 2nd Ed., 1947, Vol. 1, p. 38–39.
Encyclopedia of Polymer Science and Technology, Interscience Publishers, N.Y., N.Y., Vol. 12, (1970), p. 42, 50, 54, 55.

*Primary Examiner*—Arthur P. Demers
*Attorney, Agent, or Firm*—Joseph J. O'Keefe; Charles A. Wilkinson

[57] ABSTRACT

A method of producing synthetic resin composites with small size magnetic fillers. A magnetic field is applied during composite forming to give improved mechanical properties.

6 Claims, No Drawings

METHOD OF MAKING SYNTHETIC RESIN COMPOSITES WITH MAGNETIC FILLERS

BACKGROUND OF THE INVENTION

This invention relates to plastic and non-metallic articles, shaping and treating processes, and more particularly to such processes including the direct application of wave energy to align particular matter.

Prior art plastic forming processes in which magnetic fields were applied to align magnetic materials in the polymer are known. However, these processes were for the purpose of imparting improved electrical conductivity, or improved particle mixing. Prior art processes for making magnetic filler-synthetic resin composites did not recognize that parameters, such as particle size, could effect properties of the composite. Applying magnetic fields to synthetic resins filled with small size magnetic fillers to impart improved mechanical properties, such as rigidity, was heretofore unknown.

SUMMARY OF THE INVENTION

It has been discovered that a process in which small size (generally less than an average of about 20 microns) magnetic particles are magnetically aligned in a rigid synthetic resin matrix during composite formation results in a product with unexpected improved mechanical properties.

In the process of this invention, iron powder, iron filings, iron oxides, etc. are combined with a synthetic resin such as a polyester or an ABS resin. The resin-filler mixture is subjected to a magnetic field during the polymerization of the resin to align the magnetic particles in the composite. The resulting resin-based composite has improved flexure and tensile properties.

DESCRIPTION OF THE PREFERRED EMBODIMENT

Rigid plastic sheets were prepared by mixing 45 weight percent of a thixotropic polyester, in liquid form (Reichhold Chemical 33-090), with 54.55 weight percent 4 micron iron powder. To this slurry was added 0.45 weight percent of a 60% methylethyl ketone peroxide (Reichhold Chemical 46–700). The resulting mixture was degassed and poured into a 6.5 inch × 8 inch × 0.25 inch mold. The filled mold was placed in the center of a cylindrical electromagnet of 7 inch I.D. × 11 inch O.D. × 9 inch length having 2950 turns of 16 gage copper wire. The electromagnet was connected to a D.C. power source, supplying 30 amperes at 100 volts, to produce a field of about 400 gauss in the magnetic core. The field remained in force until the resin gelled, about 15 minutes.

Table I contains data on the mechanical properties of rigid plastics made in accordance with the above example with, and without, application of a magnetic field during composite formation. In this application, field is defined as follows: when the magnetic lines of force are parallel to the long axis of the composite, the magnetic field is referred to as "longitudinal". Similarly, when the lines of force are in a direction perpendicular to the long axis of the composite, the field is referred to as "transverse". The data shown in Table I was compiled from measurements taken in the long axis of the composite.

TABLE I

| 1. No. Composite Composition | 2. Longitudinal Magnetic Field, Gauss | 3. Tensile Strength, psi | 4. Tensile Modulus, psi | 5. Flexure Strength, psi | 6. Flexure Modulus, psi |
|---|---|---|---|---|---|
| 1 Polyester + 15 volume % (54.5 weight %) 4 μ Iron Powder | 0 | 7,350 | 861,888 | 11,850 | 800,136 |
| 2 Polyester + 15 volume % (54.5 weight %) 4 μ Iron Powder | 400 | 8,010 | 1,133,005 | 12,813 | 1,101,814 |
| 3 Polyester + 15 volume % (54.5 weight %) 57 μ Water Atomized Iron Powder | 0 | 5,936 | 845,254 | 8,219 | 718,758 |
| 4 Polyester + 15 volume % (54.5 weight %) 57 μ Water Atomized Iron Powder | 400 | 6,747 | 915,612 | 8,115 | 676,124 |
| 5 Polyester + 15 volume % (43.7 weight%) As-collected BOF fume (20 μ) | 0 | 4,086 | 837,182 | 5,460 | 750,714 |
| 6 Polyester Plastic +15 volume % (43.7 weight %) As-collected BOF fume (20 μ) | 400 | 4,416 | 976,563 | 8,434 | 872,510 |

Referring to Table I, column 1 identifies the resin and magnetic filler and gives the volume percent and the weight percent of the filler in the composite. Composites Nos. 1 and 2 were made with carbonyl iron powder. Carbonyl iron powder refers to fine spheroidal iron powder produced by decomposition of iron carbonyl gas. Composites Nos. 3 and 4 were made with water atomized iron powder. Water atomized iron powder refers to spheroidal iron powder produced by fragmentation of a stream of liquid iron by water jets. Composites Nos. 5 and 6 contain "as-collected" BOF fume. BOF (Basic Oxygen Furnace) fume is principally spheroidal iron oxide formed in the atmosphere above the charge in a steel making vessel. Fume is generally collected in hoods from which it was removed and used as a filler without further treatment. Column 2 indicates the strength and direction of the magnetic field applied during composite formation. Columns 3, 4, 5 and 6 contain data on physical properties of the composite measured in pounds per square inch.

Data for columns 3, 4, 5 and 6 was obtained from specimens machined from composites.

Tensile strength and tensile modulus shown in columns 3 and 4 was measured in accordance with ASTM Specification D638-60T. Tensile modulus is sometimes referred to as the modulus of elasticity. Flexure strength and flexure modulus shown in columns 5 and 6 were measured in accordance with ASTM Specification D790-59T. Flexure modulus is sometimes referred to as the modulus of elasticity in bending. Values reported are an average of at least two test results.

The data in Table I demonstrates that composites made in the presence of a magnetic field are superior to those produced in the absence of such a field if the average particle size is below about 20 microns.

The data in Table I analyzed in regard to the magnitude of improvement in mechanical properties in fume filled composites, in the example of composites Nos. 5 and 6, shows:

| Mechanical Property | Percent Increase in Property by Application of 400 longitudinal Gauss Magnetic Field |
|---|---|
| Tensile Strength | 8.07 |
| Tensile Modulus | 16.64 |
| Flexure Strength | 54.40 |
| Flexure Modulus | 16.22 |

Particle size is critical in the process of this invention. Composites Nos. 2 and 4, for example, demonstrate the difference in composites made with 4 microns and 57 microns iron powder filler.

| Mechanical Strength | Percent Increase in Property by Application of 400 longitudinal Gauss Magnetic Field | |
|---|---|---|
| | 4 μ Iron Powder | 57 μ Iron Powder |
| Tensile Strength | 8.90 | 13.70 |
| Tensile Modulus | 31.40 | 8.30 |
| Flexure Strength | 8.10 | −12.65 |
| Flexure Modulus | 37.70 | −8.90 |

It can be readily seen from the above particle size analysis of Table I that, composites whose filler size is as high as 57 microns show no significant, if any, improvement in tensile or flexure properties upon the application of the magnetic field.

Metallographic examination of composites showed that the 4 micron iron powder, the 57 micron iron powder and the 20 micron fume particles were aligned in composites Nos. 2, 4 and 6 respectively as a result of application of 400 gauss magnetic field. The improvement in mechanical properties as a result of alignment of spheroidal particles is unexpected. The fact that application of magnetic field produces no improvement in the mechanical properties of composite with 57 micron powder indicates that alignment of particles is necessary, but not a sufficient condition to improved mechanical properties. Unexpectedly, small particle size is also required for improved properties. The upper limit of improvement in flexure and tensile improvement of aligned, magnetic particle filled, synthetic resins is with particles whose average size is about 20 microns.

Parameters other than particle size also affect the flexure and tensile properties of composites of this invention. Test results indicate that these parameters are in general those which hinder particle alignment. Thus, volume per cent fillers above about for example 80%, very low magnetic field strength, for example 5 gauss, or resins with very high viscosities such as will prevent alignment, will lessen the degree improvement in tensile or flexure properties.

It was also found that field direction is important in that mechanical property improvement is greater in longitudinal than in transverse fields.

Variations within the scope of this invention include all magnetic particles, whether iron powder, filings, iron oxides or other magnetizable material, so long as the average size is generally below about 20 microns.

Further, the matrix of this invention may be any resin which is miscible with the filler, but produces a rigid structure when cured. Suitable resins include thermosetting polymers such as polyester and thermoplastic polymers such as acrylonitrile-butadiene-styrene (ABS). Suitable polyesters are made by the reaction of dibasic acids, such as maleic acid, with dihydric alcohols. Mixtures of saturated and unsaturated acids are common. Maleic anhydride and fumaric acid are the usual unsaturated acid components, while phthalic anhydric, isophthalic acid, or adipic or azelaic acid are the corresponding saturated materials. Commonly used glycols include ethylene, propylene, diethylene, dipropylene, and certain butylene glycols. Added polymerizable monomers may be styrene, vinyltoluene, dialkyl phthlate, methylmethacrylate, chlorostyrene, methylstyrene, divinyl benzene or trialkyl cyanurate.

ABS resins are usually either, a mixture of styrene-acrylonitrile copolymer with acrylonitrile-butadiene rubber, or a mixture of styrene-acrylonitrile copolymer with a graft of the same copolymer onto polybutadiene.

The resin matrix of this invention is preferably a liquid in the unpolymerized form, but may be granules or other physical forms, so long as magnetic alignment is not greatly impeded.

The magnetic field must be in force until the resin gels sufficiently to hold the aligned particles in place. The time period of field application thus varies with the composition and/or the physical state of the polymer, but is easily ascertainable to those skilled in the art.

I claim:

1. A method of improving the mechanical properties including tensile and flexure strengths and tensile and flexure modulus in synthetic resin, magnetic particle reinforced, composites comprising:
   a. providing synthetic resin selected from the group consisting of thermosetting polyester polymers and thermoplastic acrylonitrile-butadiene-styrene polymers in a low viscosity fluid state, combining with said fluid synthetic resin particulate magnetic fume material derived from a steelmaking operation of an average particle size no greater than about 20 microns and in amounts by volume not to exceed about 80% of the total volume of the composite, b. applying to said fluid synthetic resin and said particulate magnetic fume material a magnetic force in substantially the direction in which improvement in the properties of the final plastic composite is desired of sufficient strength, and maintaining said magnetic force for a time sufficient to magnetically align the magnetic fume material in said resin in planes parallel to said magnetic force; and c. converting said resin from a fluid to a rigid state while maintaining the particle alignment to form an integral rigid composite wherein said tensile and flexure strength and tensile and flexure modulus of said composite are increased.

2. The method of claim 1 in which the magnetic field is about 400 gauss.

3. A method of improving the mechanical properties including tensile and flexure strengths and tensile and flexure modulus in synthetic resin, magnetic particle reinforced, composites comprising:

a. providing synthetic resin material selected from the group consisting of thermoplastic acrylonitrile-butadiene-styrene type and thermosetting polyester type polymers in a fluid state, combining said fluid synthetic resin with particulate fume material derived from a steelmaking operation and having an average particle size no greater than about 20 microns and in amounts by volume not to exceed about 80% of the total volume of the composite, b. applying to said synthetic resin and particulate fume mixture a magnetic force of sufficient strength and maintaining said magnetic force for a time sufficient to magnetically align the fume material in said resin in planes parallel to said magnetic forces, and c. converting said resin from a fluid to a substantially rigid state while maintaining the fume particle alignment to form an integral rigid composite wherein said tensile and flexure strength and tensile and flexure modulus of said composite are increased.

4. The method of claim 3 in which the magnetic field is applied in the direction in which particular improvement of properties is desired.

5. The method of claim 4 in which the plastic composite is longitudinally extended and the direction of the applied magnetic field is substantially longitudinally aligned with said plastic composite.

6. The method of claim 5 in which the magnetic field is at least 400 gauss.

* * * * *